H. MOURADIAN.

METHOD OF LOCATING SPECIAL TRANSPOSITION POINTS.

APPLICATION FILED OCT. 5, 1918.

Reissued Feb. 18, 1919. 14,593.

INVENTOR.
Hughes Mouradian,
BY G. E. Folk,
ATTORNEY

UNITED STATES PATENT OFFICE.

HUGHES MOURADIAN, OF PHILADELPHIA, PENNSYLVANIA, ASSIGNOR TO AMERICAN TELEPHONE AND TELEGRAPH COMPANY, OF BOSTON, MASSACHUSETTS, A CORPORATION OF NEW YORK.

METHOD OF LOCATING SPECIAL TRANSPOSITION-POINTS.

14,593. Specification of Reissued Letters Patent. Reissued Feb. 18, 1919.

Original No. 1,228,468, dated June 5, 1917, Serial No. 140,245, filed January 2, 1917. Application for reissue filed October 5, 1918. Serial No. 257,061.

*To all whom it may concern:*

Be it known that I, HUGHES MOURADIAN, residing at Philadelphia, in the county of Philadelphia and State of Pennsylvania, have invented certain Improvements in Methods of Locating Special Transposition-Points, of which the following is a specification.

In transposing such signaling circuits as those employed in telephony to overcome inductive disturbances created by high potential transmission lines and the like, it is frequently found that effective neutralization is not attained over all exposures by uniform transposition, because of irregularities occurring within the sections, and consisting chiefly of variations in the horizontal and vertical distances between the disturbing conductor and the signaling circuit. To obviate this difficulty, it has been customary to introduce special transpositions in the regular sections, the points being determined by a consideration of the average variation in spacing between the conductors over subsections of the full sections. This, however, is not a sufficiently exact procedure to give always satisfactory results. The present invention provides a method readily carried out in the field whereby the intermediate transposition points are located with such accuracy that substantial neutralization of the disturbances, especially those due to electrostatic induction, is obtained. More generically, it consists in determining at a plurality of transposition points the changes in the electrical characteristics of the disturbed circuit necessary to effect an approximate neutralization of the disturbances, and locating the desired transposition at a point fixed by the character of such changes.

Figure 1:
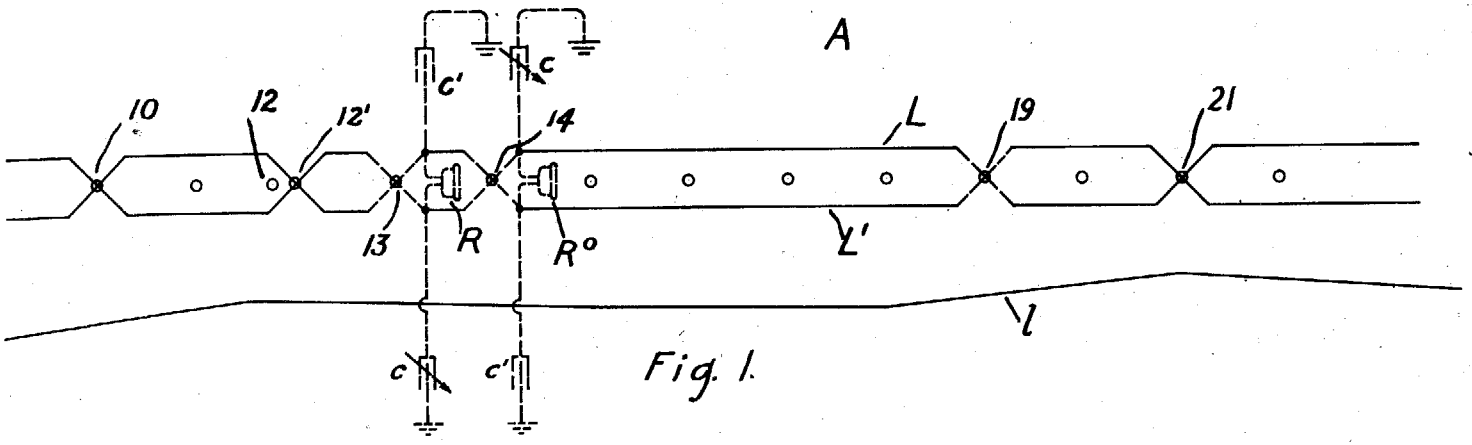
Figure 2:
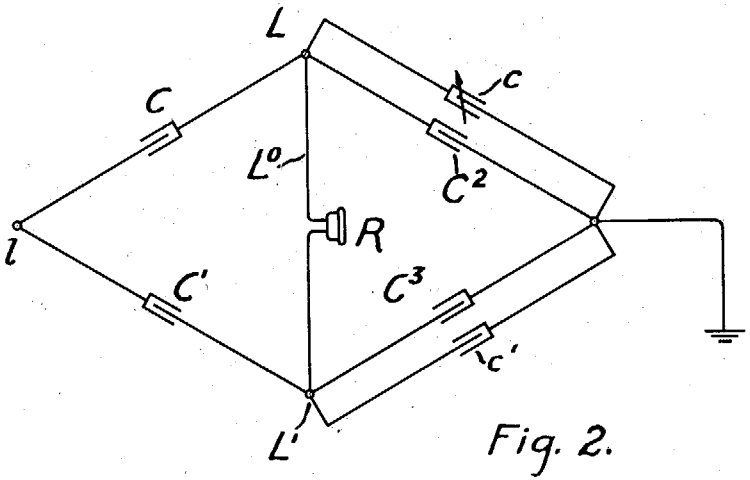

In the accompanying drawing, Figure 1 illustrates diagrammatically one full transposition section of a signaling circuit to which my improved invention may be applied; and Fig. 2 shows schematically the principle upon which the invention is based.

Ordinarily the volume of current flowing over high tension conductors is so small that the chief effect on adjacent signaling circuits is electrostatic. For a transposition section of a signaling circuit, as that indicated at A between the poles 10 and 21 in Fig. 1, the mutual capacity effects between the two conductors L and L′ thereof and the high tension conductor 1 is as represented in Fig. 2, there being capacities C and C′ between 1 and L and L′ respectively, and capacities $C^2$ and $C^3$ between the last-named conductors and ground. This, it will be seen, forms a Wheatstone balance, the arms of which are furnished by the four capacities just enumerated, while a connection between the lines L and L′ provides the bridge conductor $L^0$. It will be evident that if the product of the capacities C and $C^3$ equals the product of the capacities C′ and $C^2$, the potentials at the bridge terminals will be equal and no disturbing current will flow in the signaling circuit. Further it is apparent that this condition may readily be obtained by the introduction of artificial capacities or condensers between the conductors, L, L′ and ground. This relation is taken advantage of in the performance of the present method in the following manner:

Considering the signaling circuit, as illustrated in Fig. 1 the conductors are carried by poles 10 to 21, inclusive, the transpositions for the regular section A thereof being shown at the first and last of these poles. If no special transpositions have already been cut in for the purpose of remedying disturbances produced by the varying positions of the conductor 1 with relation to the conductors L and L′ along the section, tentative transpositions are made at poles 13 and 19, these points appearing from inspection to be the ones best suited for the purpose. There being still disturbance in the signaling circuit, as shown by listening at a high impedance receiver R bridged across the conductors L and L′ at pole 13, a variable condenser *c* is connected between the conductor L and ground, a sufficient capacity being introduced by a condenser *c′* between conductor L′ and ground to neutralize any constant capacity which may exist in *c*. The section A being preferably opened at the extremities during the test to isolate it from adjacent sections, condenser *c* is adjusted until, upon listening at the receiver R, which by virtue of its connection across the circuit occupies a position in the bridge conductor $L^0$ of the Wheatstone balance, as illustrated in Fig. 2, the sounds due to induction from the conductor 1 are minimized. The tentative transposition is then moved to an adjacent pole, as 14, and a like test made. These two capacity values, and the relation between the points of application to the signaling line L with respect to direction and distance, furnish means for determining the location of the transposition which will result in neutralization of the disturbance without the use of artificial capacity. For example, in a case in practice it was found that in the first test an introduced capacity of 300 microfarads was required to give a balance of potential, while for the second a capacity of 610 microfarads was necessary. The distance between these transposition poles being 148 feet, it appeared that for each foot the transposition point was shifted the disturbing effect was increased to an extent demanding 2.1 microfarads for its neutralization. It was obvious from this that to obtain neutralization by the transposition, the separation of the high tension conductor from the conductors under test being substantially constant over that portion of the section A in which the test was being conducted, it must be moved from pole 13 in a direction opposite from pole 14, and that the movement in feet must equal the capacity in microfarads (300) employed to obtain a balance at the first tentative transposition divided by the number of microfarads (2.1) which balanced a foot of movement of the transposition point. In the case under consideration, it was found that by transposing L and L′ at a distance of 143 feet from pole 13 in a location at 12′ near the pole 12 there was attained substantial freedom from disturbance in the signaling circuit.

When the source of disturbance is metallic circuit or a multiphase circuit, the simple Wheatstone balance relation hereinbefore pointed out does not strictly apply, so that absolute neutralization will not result from an application of this method. It will, however, serve to determine a point of minimum disturbance.

I claim:

1. The method of locating transposition points in signaling circuits to overcome disturbances from adjacent conductors which consists in determining changes in the electrical characteristics of the circuit necessary to effect a substantial neutralization of the disturbances for a plurality of transpositions, and making the desired transposition at a point fixed by the nature of the changes in such electrical characteristics.

2. The method of determining special transposition points in signaling circuits to overcome inductive disturbances from adjacent conductors which consists in tentatively transposing the circuit, determining the capacity to ground necessary to effect a balance of the inductive disturbances, again tentatively transposing the circuit, determining the capacity necessary to effect the balance under these conditions, and finally making the transposition at a point fixed by the nature of the change in such capacities.

In testimony whereof, I have signed my name to this specification in the presence of two subscribing witnesses, this 23rd day of September, 1918.

HUGHES MOURADIAN.

Witnesses:

R. S. Henderson,

C. L. Ritchie.